United States Patent [19]

Wittwer et al.

[11] Patent Number: 5,427,614
[45] Date of Patent: Jun. 27, 1995

[54] STARCH BASED FORMULATIONS

[75] Inventors: Fritz Wittwer, Lupsingen; Ivan Tomka, Lenzbu, both of Switzerland

[73] Assignee: Warner-Lambert Company, Morris Plains, N.J.

[21] Appl. No.: 133,716

[22] Filed: Oct. 7, 1993

Related U.S. Application Data

[63] Continuation of Ser. No. 836,665, Feb. 14, 1992, abandoned.

[51] Int. Cl.⁶ .............................................. C08L 3/02
[52] U.S. Cl. ................................... 106/213; 106/214; 106/126
[58] Field of Search ............... 106/210, 211, 213, 214, 106/126

[56] References Cited

U.S. PATENT DOCUMENTS

| Number | Date | Name | Class |
|---|---|---|---|
| 3,074,803 | 1/1963 | McGowan et al. | 106/211 |
| 3,117,014 | 1/1964 | Klug | 106/213 |
| 3,653,934 | 4/1972 | Rolle | 106/126 |
| 3,765,917 | 10/1973 | Hijiya et al. | 106/126 |
| 3,865,603 | 2/1975 | Szymanski et al. | 106/130 |
| 4,076,846 | 2/1978 | Nakatsuka et al. | 426/512 |
| 4,125,495 | 11/1978 | Griffin | 260/17.4 ST |
| 4,500,358 | 2/1985 | Mayer et al. | 106/135 |
| 4,556,552 | 12/1985 | Porter et al. | 424/482 |
| 4,673,438 | 6/1987 | Wittwer et al. | 106/126 |
| 4,738,724 | 4/1988 | Wittwer et al. | 106/126 |
| 4,900,361 | 2/1990 | Sachetto et al. | 106/213 |
| 4,931,488 | 6/1990 | Chiquet | 523/126 |
| 5,087,650 | 2/1992 | Willett | 524/47 |
| 5,095,054 | 3/1992 | Lay et al. | 524/47 |
| 5,158,810 | 10/1992 | Oishi et al. | 428/35.4 |
| 5,205,863 | 4/1993 | Elion | 106/154.1 |

FOREIGN PATENT DOCUMENTS

| 1333966 | 10/1973 | United Kingdom | C08B 25/02 |
| 1347212 | 2/1974 | United Kingdom | C08F 29/30 |
| 1592062 | 7/1981 | United Kingdom | C08L 101/00 |
| 1600496 | 10/1981 | United Kingdom | C08J 3/20 |
| WO9102025 | 2/1991 | WIPO | C08L 3/02 |

*Primary Examiner*—Helene Klemanski
*Attorney, Agent, or Firm*—Fitzpatrick, Cella, Harper & Scinto

[57] ABSTRACT

Starch based formulations for processing under applied pressure which are particulate and free-flowing at room temperatures, characterized in that it contains:

| | quantity |
|---|---|
| (a) chemically non-modified starch | 72–89.58 parts |
| (b) at least one lubricant/release agent | 0–5 parts |
| (c) at least one melt-flow accelerator | 0–5 parts |
| (d) texturing agent | 0.02–1 parts |
| (e) water | 10–22 parts |

(i) the components (b) and (c) together always result in at least 0.4 parts and at most 5 parts and
(ii) the sum of the components (a), (b), (c), (d) and (e) always is 100 parts.

14 Claims, No Drawings

STARCH BASED FORMULATIONS

This is a continuation of application Ser. No. 07/836,665 filed on Feb. 14, 1992 now abandoned.

It is known to process starch under applied pressures and to manufacture pressure-formed molded bodies therefrom, e.g. by means of injection molding. Preferably, such molded bodies are manufactured for fillint with pharmaceuticals, comestibles, chemicals and others, particularly as pharmaceutical capsules for the dosed processing of medicaments. Such vessels consist as a rule of a container part and a closure part, both parts fitting exactly into one another in the closed state and resulting in a tightly sealed vessel.

The manufacture of such pressure-formed vessels from natural starch is known from European Patent Application No. 84 360 940.8 (Publn. No. 118 240).

In the industrial fabrication it is necessary to manufacture the pressure-formed articles, in particular the very thin-walled pharmaceutical capsule parts, with the greatest precision and at high speed. In addition, during manufacture a minimum of defective parts should arise in order to minimize subsequent controls and interruptions in the filling machines.

Mastering these problems of processibility has proved to be surprisingly difficult. With the manufacture of very thin-walled parts, for example with wall thicknesses of under 0.5 mm, these problems intensify.

In particular a very good flow behavior of the starch mixture is necessary, both with reference to the starting powder (freely flowing starch-based starting mixture), as well as during the total injection molding process as far as the fluid state. The molten mass should, to avoid high pressures, flow as easily as possible and should, with reference to the temperature and the intermixing with the additives and the water, show as homogenous a distribution as possible.

Furthermore, the injection-molded parts should be easily removable from the mold, as well as having a good dimensional stability, in order to avoid adherence to the wall in the tool or deformation on ejection.

Surprisingly, the problems can be solved, if 1. a starch starting mixture which is particulate and free-flowing at room temperature is used, which results under the processing conditions in a molded article with practically amorphous wall structure, 2. the viscosity of the molten mass at 90°–240° C. and particularly 140°–190° C. lies between 2500 and 50 Pa.s (=Pascal×second), preferably 2000 and 50 Pa.s, in particular 1500–50 Pa.s, and 3. the glass transition point of the mixture heated in a closed vessel to 140°–190° C. lies at 25° C. at least, preferably at 45° C. at least and in particular at about 65° C. These conditions are achieved with the composition defined in the following.

The composition specified in the following permits injection-molding machines to be driven in continuous 24-hour operation with little chance of process defects and without the above-mentioned disadvantages.

The present invention relates in this sense to basic starch-based formulations for processing under applied pressure which are particulate and free-flowing at room temperatures, characterized in that these contain:

| | | quantity |
|---|---|---|
| (a) | chemically non-modified starch | 72–89.58 parts |
| (b) | at least one lubricant/release agent | 0–5 parts |
| (c) | at least one melt-flow accelerator | 0–5 parts |
| (d) | texturing agent | 0.02–1 parts |
| (e) | water | 10–22.0 parts |

(i) the components (b) and (c) together always result in at least 0.4 parts and at most 5 parts and (ii) the sum of the components (a), (b), (c), and (d) and (e) always is 100 parts.

It has further been found that these formulations are suitable for the use in the processing under applied pressures e.g. pressure molding, injection molding, blow molding, extrusion etc.

These basic formulations can contain further components, as is described further below. Parts always mean weight parts.

By chemically non-modified starch, naturally occurring plant carbohydrate is to be understood, which mainly consists of amylose and amylopectin. This starch is obtained for example from potatoes, rice, tapioca, corn, rye, oats, wheat and other plants. The term starch with modified physical structure is to be understood to refer to gelatinized or pre-cooked starch and highly water-soluble starch, e.g. starch with a reduced average molar mass. Such starch or a mixture of such starches can be processed in the specified composition under pressure and elevated temperature to compact molded bodies.

Preferably, the proportion of physically altered starch to the natural starch is not higher than 50%, more preferably not higher than 20%. Most preferred is natural starch.

The starch (a) is present in the basic formulation in a quantity of 72–89.58 parts, more preferably 75–85 parts and most preferably around 79–83 parts, related to 100 parts of this composition.

The starch has preferably an amylose content of 0–70% and amylopectin of 100–30%. The type of starch most preferred is potato starch.

A suitable lubricant/release agent (b) for example may be comprised of animal and vegetable fats individually or in a mixture, in particular, hydrogenated fats are suitable, preferably such as are solid at room temperature. Preferably they have a melting point of over 50° C. As a rule, these fats are triglycerides with a proportion of $C_{14}$-, $C_{16}$- and $C_{18}$-acids, for example $C_{18}$ (around 65%), $C_{16}$ (around 30%), $C_{14}$ (around 5%).

The amount of lubricant/release agent employed is preferably 0–5 parts, more preferably 0–3.0 parts and most preferably 0.6–1.2 parts related to 100 parts of the basic formulation.

These lubricant/release agents act simultaneously as softening agents and viscosity depressants so that the addition of these other agents is unnecessary.

The melt-flow accelerator (c) may be selected from solid mono- and diglycerides, preferably long-chained acids such as the $C_{14}$-, $C_{16}$-, $C_{18}$-fatty acids, which are preferred and phosphatides, in particular lecithin is most preferred. Preferred additive quantities are 0–5.0 parts, more preferably 0.1–2.0 and most preferably 0.2–1.0 parts, of such individual compounds or a mixture of such compounds related to 100 parts of the basic formulation.

The sum of the components (b) and (c) always amounts to at least 0.4 parts and preferably 0.8–2.0 parts related to 100 parts of the basic formulation.

The texturing agent (d) is titanium dioxide or silicondioxide or a mixture of these compounds. It was found that such compounds guarantee a free flowing of the starting material as a powder at room temperature and further prevent the formation of bridges in the hopper and at the screw during processing, which hinder the feeding of the starting material onto the screw. Through the addition of these components the dosing of the starch material takes place consistently and rapidly from cycle to cycle.

It is thus not necessary to granulate or otherwise pretreat the starting material.

The quantity of the texturing agent is preferably 0.02–1 parts, related to 100 parts of the basic formulation. For titanium dioxide the optimum addition quantity lies at around 0.4 parts and for silicon dioxide at around 0.1 parts both values related to 100 parts of the basic formulation. Naturally more titanium dioxide or silicon dioxide can be added. The excess then acts as a filler and can also influence negatively the properties of the product.

The water (e) is present in a quantity of 10–22 parts, preferably 10–20 parts, more preferably 15–19 parts related to 100 parts of the basic formulation. In the manufacture of thin-walled articles the preferred ranges are most applicable.

The process conditions depend principally on the starch used, the components (b) to (e) and the additives mentioned further below, which are present in addition if necessary.

The higher the water content, the lower are the temperatures and pressures which can be selected in the injection-molding process; the lower the water content, the higher the pressures and temperatures to be selected. The selection of suitable pressures and temperatures is simple and can be easily determined by one of ordinary skill in the art. The pressures suitable in the manufacture of thicker-walled articles are in the range of from $300 \times 10^5$ N/m$^2$ to about $3000 \times 10^5$ N/m$^2$ and for thinner-walled articles in the range of about $600 \times 10^5$ N/m$^2$ to about $3000 \times 10^5$ N/m$^2$ preferably about $900 \times 10^5$ to about $1500 \times 10^5$ N/m$^2$.

Extrusion molding pressures of less than 10 bars are suitable, dpending on the water content. Suitable temperatures lie predominantly in the range from about 80°–240° C., preferably at about 130°–210° C. and in particular at about 150°–190° C.

Other known techniques, such as injection-molding machines or extruders, may also be used.

Depending on the same water content, potato starch can be processed more easily, i.e. with lower pressure and temperature conditions, than wheat starch. The degree of difficulty grows in the order of potato starch, wheat starch, corn starch, and rice starch. Preferred is potato starch and wheat starch, in particular potato starch.

In the above mentioned starch based formulations, starch can be replaced up to 50% but preferably not higher than 20% by one or a mixture of other hydrophilic material. Such other hydrophilic materials are polymers such as gelatin and vegetable proteins such as: sunflower protein, soybean proteins, cotton seed proteins, peanut proteins, rape seed proteins, blood proteins, egg proteins, acrylated proteins; water-soluble polysaccharides such as: alginates, carrageenans, guar gum, agar-agar, gum arabic and related gums (gum ghatti, gum karaya, gum tragacanth), pectin; water-soluble derivatives of cellulose: alkylcelluloses hydroxyalkylcelluloses and hydroxyalkyl-alkylcelluloses, such as: methylcellulose, hydroxy-methylcellulose, hydroxyethylcellulose, hydroxypropyl-cellulose, hydroxyethylmethylcellulose, hydroxypropyl-methylcellulose, hydroxybutylmethylcellulose, cellulose esters and hydroxyallylcellulose esters such as: celluloseacetylphthalate (CAP), hydroxypropyl-methylcellulosephthalate (HPMCP); carboxyalkylcelluloses, carboxyalkylcellulose esters, carboxyalkylcellulose esters such as: carboxymethylcellulose and their alkali metal salts; water-soluble synthetic polymers such as: polyacrylic acids and polyacrylic acid esters, polymethacrylic acids and polymethacrylic acid esters, polyvinylacetates, polyvinylalcohols, polyvinylacetatephthalates (PVAP), polyvinylpyrrolidone, polycrotonic acids; also suitable are phthalated gelatin, gelatin succinate, crosslinked gelatin, shellac, water soluble chemical derivatives of starch, cationically modified acrylates and methacrylates possessing, for example, a tertiary or quaternary amino group, such as the diethylaminoethyl group, which may be quaternized if desired; and other similar polymers.

Preferably the starch is replaced by not more than by about 3–10% of these compounds.

Softening agents may also be added to the basic formulation, in quantity of preferably 0.5–10 parts, in particular 0.5–5 parts, related to the specified 100 parts. The starting materials may also be mixed with liquid additives until they are completely absorbed and a firm flowable mixture arises. An excess or a sticking of the individually mixed particles must be avoided. Suitable softening agents are for example polyalkylene oxides, like polyethyleneglycols, polypropyleneglycols, polyethylenepropyleneglycols; low-molecular organic softening agents like glycerin, glycerin mono-, di- and triacetate; propyleneglycol, sorbitol, sodium diethyl sulfosuccinate, triethyl-citrate, tributylcitrate and mixture thereof.

The sum of the weight parts of water and softening agent should preferably not surpass the specified maximum contents for water. Preferably, therefore, the sum of water and softening agent amounts to 10–22, preferably 10–20 and preferably 15–19 parts related to 100 parts of the basic formulation.

The mixture can also be dyed. Suitable dyestuffs are for example known azo dyes or organic or inorganic pigments, or naturally occurring dyestuffs. Preferred are inorganic pigments, like the oxides of iron or of titanium which are known per se in a concentration of 0.001–10%, preferably 0.5–5%, related to the weight of all the components.

As mentioned above, the formulation of the present invention can be used in all types of molding techniques under applied pressures such as pressure molding, injection molding, blow molding or extrusion and it is possible to produce articles such as containers, bottles, sheets, sacs, films, packaging materials, tubes, rods, pharmaceutical capsules etc. in all the numerous variations known.

The following examples are provided for illustrative purposes. It is readily understood that variations in the materials used and/or processing parameters followed are intended to be within the scope of the present invention. The examples are therefore for demonstration effect only and should not be regarded as limiting the spirit and scope of the invention as recited in the claim that follow.

EXAMPLE 1

A composition consisting of 81 parts of natural potato starch, one part of the hydrated triglyceride containing the fatty acids $C_{18}:C_{16}:C_{14}$ in a ratio of 65:31:4 weight percent, 0.7 parts lecithin, 0.3 parts titanium dioxide and 17 parts water is mixed in a powder mixer for 10 minutes. Thereafter a freely flowing powder is obtained. This powder is fed into the hopper of an injection-molding machine and, at a temperature of 180° C. and a pressure of 1500 bar, injected into an injection molding tool for capsule body and cap parts whose mold wall temperature lies at 40° C. After cooling and ejecting from the mold a dimensionally stable capsule body and cap part is obtained, which can easily be processed on a filling machine.

With this mixture the injection molding machine can easily be driven in 24-hour operation without interruptions to the machine a strongly reduced number of defects to the capsule parts being detectable.

Analogous results are obtained by using the following formulations according to table 1:

TABLE 1

| | STARCH | | COMPONENT b) | | COMPONENT c) | | COMPONENT d) | | WATER | OTHERS | |
|---|---|---|---|---|---|---|---|---|---|---|---|
| No. | Type | % | Type | % | Type | % | Type | % | % | Type | % |
| 1 | Potato | 75.00 | hydrated vegetable fat | 1.25 | Lecithin | 1.5 | $TiO_2$ | 0.25 | 22.0 | — | — |
| 2 | Potato | 80.00 | hydrated vegetable fat | 1.0 | " | 0.9 | " | 0.1 | 18.0 | — | — |
| 3 | Potato | 88.6 | hydrate vegetable fat | 0.8 | " | 0.5 | $SiO_2$ | 0.1 | 10.0 | — | — |
| 4 | Wheat | 78.0 | hydrated vegetable fat | — | Monoglyceride, $C_{18}$ | 5.0 | " | 3.04 | 19.0 | dyestuff | 0.96 |
| 5 | Wheat | 79.0 | hydrated vegetable fat | 2.05 | — | — | $TiO_2/SiO_2$ 1:1 | 0.95 | 18.0 | — | — |
| 6 | Wheat | 85.0 | hydrated animal fat | 2.80 | — | — | $TiO_2$ | 0.20 | 12.0 | — | — |
| 7 | Maize | 75.0 | hydrated animal fat | 4.80 | Monoglycerid, $C_{18}$ | 0.2 | " | 0.15 | 17.0 | pre-cooked starch | 2.85 |
| 8 | Maize | 78.0 | hydrated animal fat | 3.0 | Monoglyceride, $C_{18}$ | 1.0 | " | 0.05 | 14.0 | pre-cooked starch | 3. |
| 9 | Rice | 79.0 | — | — | Monoglycerid, $C_{18}$ | 2.0 | $SiO_2$ | 1.0 | 17.5 | dyestuff | 0.5 |
| 10 | Rice | 80.25 | " | 0.9 | Diglyceride, $C_{18}, C_{16}$ | 0.6 | " | 0.25 | 15.0 | Glycerin | 3 |
| 11 | Tapioca | 75.2 | " | 0.9 | Diglyceride, $C_{18}, C_{16}$ | 0.6 | " | 0.3 | 21.0 | HMPCP | 2 |
| 12 | Potato | 73.96 | " | 2.0 | Diglyceride, $C_{18}, C_{16}$ | 2.0 | " | 0.04 | 17.0 | PEG 1000 | 5 |
| 13 | Potato | 75.25 | " | 1.5 | Diglyceride, $C_{18}, C_{16}$ | 1.0 | $TiO_2$ | 0.25 | 18.0 | PEG 4000 | 4 |
| 14 | Potato | 75.25 | vegetable fat | 1.5 | Lecithin | 1.0 | " | 0.25 | 18.0 | Sorbitol | 4 |
| 15 | Wheat | 60.00 | " | 1.5 | " | 1.2 | " | 0.25 | 17.0 | Polyacrylic acid | 20.05 |

We claim:

1. A starch formulation for manufacturing injection-molded particles, comprising:
    (a) a chemically non-modified starch in an amount within the range of from about 72 to about 89.58 weight percent;
    (b) at least one lubricant/release agent in an amount within the range of from about 0 to about 5 weight percent;
    (c) at least one melt-flow accelerator in an amount within the range of from about 0 to about 5 weight percent;
    (d) a texturizing agent, wherein said texturizing agent is selected from the group consisting of silicon dioxide, titanium dioxide and combinations thereof; and
    (e) water, wherein said texturizing agent of (d) is present in an amount within the range of from about 0.02 to about 1 weight percent of said formulation to permit said formulation to be particulate and free flowing at room temperature under its own weight at a rate sufficient to make it suitable to feed continuously through a hopper and into a screw barrel during processing thereby minimizing the number of defective injection-molded parts manufactured.

2. The formulation of claim 1, wherein said chemically non-modified starch comprises a naturally occurring carbohydrate, selected from the group consisting of carbohydrates obtained from potatoes, rice, tapioca, corn, rye, oats, wheat or other plants, gelatinized starch, pre-cooked starch, highly water-soluble starch and combinations thereof.

3. The formulation of claim 2, wherein said starch is present in said formulation in an amount within the range of from about 75 to about 85 weight percent.

4. The formulation of claim 3, wherein said starch is selected from the group consisting of potato starch and wheat starch.

5. The formulation of claim 1, wherein said lubricant/release agent of (b) is present in said formulation in an amount up to about 3 weight percent.

6. The formulation of claim 1, wherein said lubricant/release agent of (b) is selected from the group consisting of animal fat, vegetable fat, hydrogenated animals fats, hydrogenated vegetable fats and combinations thereof, wherein said fats have a melting point greater than about 50° C.

7. The formulation of claim 6, wherein said fats contain a triglyceride comprising $C_{14}$, $C_{16}$ and $C_{18}$ fatty acid side chains.

8. The formulation of claim 7, wherein said lubricant/release agent (b) is a member selected from the group consisting of monoglycerides and diglycerides, wherein each member of said group contains fatty acid side chains selected from the group consisting of $C_{14}$, $C_{16}$ and $C_{18}$ chain lengths, and lecithin.

9. The formulation of claim 1, further comprising a softening agent within the range of from about 0.5 to about 10 weight percent.

10. The formulation of claim 9, wherein said softening agent is selected from the group consisting of polyalkylene oxide, glycerin and acetates thereof, propylene glycol, sorbitol, natrium-diethyl-sulfosuccinate, triethylcitrate, tri-butylcitrate and combinations thereof.

11. A method for using a texturizing agent in a starch formulation for rendering the starch formulation in a particulate and free-flowing form at room temperature under its own weight, said method comprising the steps of:
(a) providing the starch formulation, wherein the starch formulation comprises:
(i) a chemically non-modified starch;
(ii) at least one lubricant/release agent;
(iii) at least one melt-flow accelerator; and
(iv) water;
(b) providing a texturizing agent to the starch formulation of (a) in an amount within the range of from about 0.02 to about 1 weight percent of the formulation; and
(c) subjecting the resulting formulation of (b) to an applied pressure within the range of from about zero to about $3,000 \times 10^5$ N/m² and a temperature within the range of from about 80° C. to about 240° C.

12. A method for using a texturizing agent in a starch formulation, said method comprising the step of providing a texturizing agent to the starch formulation in an amount within the range of from about 0.02 to about 1 weight percent of the starch formulations to permit the formulation to be free flowing and in particulate form at room temperature under its own weight.

13. The method of claim 11 or 12, wherein said texturing agent is provided to a starch formulation before or during processing of the starch formulation.

14. A process for manufacturing injected-molded parts from a free-flowing, particulate starch formulation, said process comprising the steps of:
(a) providing a starch formulation comprising:
(i) a chemically non-modified starch in an amount within the range of from about 72 to about 89.58 weight percent,
(ii) at least one lubricant/release agent in an amount within the range of from about 0 to about 5 weight percent, and
(iii) at least one melt-flow accelerator in an amount within the range from about 0 to about 5 weight percent;
(b) providing a texturizing agent to the starch formulation in an amount within the range of from about 0.02 to about 1 weight percent of the starch formulation to permit the formulation to be particulate and free-flowing at room temperature under its own weight, wherein said texturizing agent is selected from the group consisting of silicon dioxide, titanium dioxide and combinations thereof; and
(c) subjecting the starch formulation to elevated temperature and pressure and injection molding the so subjected starch formulation to form injection-molded parts.

* * * * *

UNITED STATES PATENT AND TRADEMARK OFFICE
CERTIFICATE OF CORRECTION

PATENT NO. : 5,427,614

DATED : June 27, 1995

INVENTOR(S): FRITZ WITTWER, ET AL.

It is certified that error appears in the above-identified patent and that said Letters Patent is hereby corrected as shown below:

On the title page, items:
[75] INVENTORS

"Lenzbu" should read --Lenzburg--.

[57] ABSTRACT

Line 3, Q: "temperatures," should read --temperature,--.

Line 4, "(i)" should read -- in which case ¶ (i)--.

COLUMN 1

Line 9, "fillint" should read --filling--.

COLUMN 2

Line 62, "0.1-2.0" should read --0.1-2.0 parts,--.

COLUMN 3

Line 68, "alkylcelluloses" should read --alkylcelluloses,--.

UNITED STATES PATENT AND TRADEMARK OFFICE
CERTIFICATE OF CORRECTION

PATENT NO. : 5,427,614

DATED : June 27, 1995

INVENTOR(S): FRITZ WITTWER, ET AL.

It is certified that error appears in the above-identified patent and that said Letters Patent is hereby corrected as shown below:

COLUMN 4

Line 8, "carboxyalkylcel-" should read --carboxyalkylalkycelluloses,--

Line 9, "lulose esters," should be deleted.

Line 22, close up right margin.

Line 23, close up left margin.

Line 26, "quantity" should read --a quantity--.

Line 67, "claim" should read --claims--.

COLUMN 5

Line 19, "machine" should read --machine,--.

Line T.1, Under COMPONENT c), "Monoglycerid," (all occurrences) should read --Monoglyceride,--

Line T.1, Under OTHERS,%, "3." should read --3.9--.

UNITED STATES PATENT AND TRADEMARK OFFICE
CERTIFICATE OF CORRECTION

PATENT NO. : 5,427,614

DATED : June 27, 1995

INVENTOR(S): FRITZ WITTWER, ET AL.

It is certified that error appears in the above-identified patent and that said Letters Patent is hereby corrected as shown below:

COLUMN 6

Line 58, "animals" should read --animal--.

COLUMN 8

Line 2, "formulations" should read --formulation--.

Line 6, "turing" should read --turizing--.

Line 8, "injected-molded" should read --injection-molded--.

Line 19, "range" should read --range of--.

Signed and Sealed this

Twenty-seventh Day of February, 1996

BRUCE LEHMAN

Attest:

Attesting Officer

Commissioner of Patents and Trademarks